(No Model.)
B. EWING.
MILK AGITATOR.
No. 503,951. Patented Aug. 29, 1893.
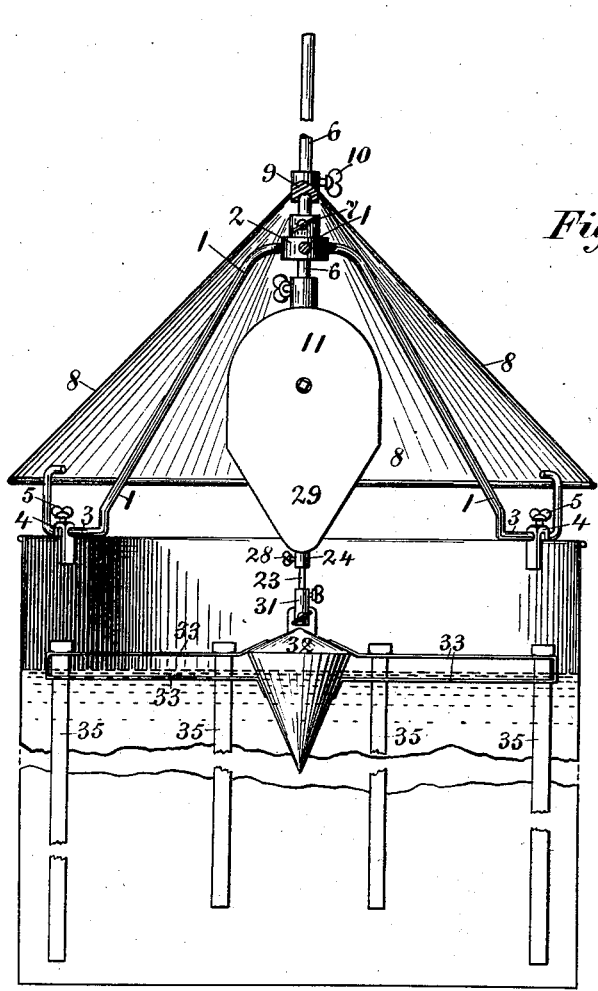
Fig.1
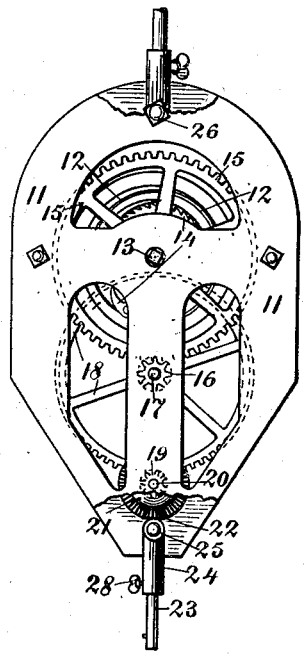
Fig.2
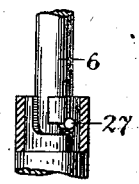
Fig.4
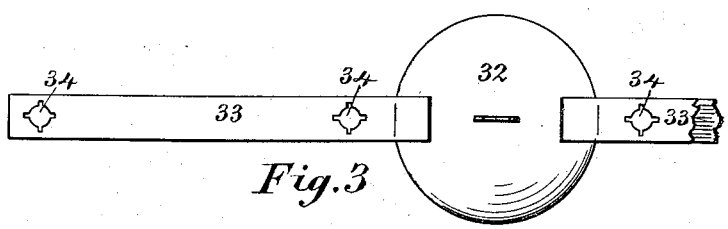
Fig.3
Fig.5
Witnesses:
Harry Dixon
Albert A. Beaver
Inventor
Benjamin Ewing
per W. J. Graham
atty.

UNITED STATES PATENT OFFICE.

BENJAMIN EWING, OF BRIGHTON, CANADA.

MILK-AGITATOR.

SPECIFICATION forming part of Letters Patent No. 503,951, dated August 29, 1893.

Application filed May 22, 1893. Serial No. 475,169. (No model.)

*To all whom it may concern:*

Be it known that I, BENJAMIN EWING, of the village of Brighton, in the county of Northumberland and Province of Ontario, Canada, have invented certain new and useful Improvements in Milk-Agitating Machines, of which the following is a specification.

My present invention relates to certain improvements in milk agitating machines, and particularly on my former device for this purpose, for which I filed an application for a patent on or about December 10, 1892, Serial No. 454,792. In the present invention I provide, first, for reduced weight and greater convenience, by employing a spring for the storage of the motive power instead of a weight, used in the former machine; secondly, I provide an adapted form of shield or roof over the mechanism and the can on which it is attached (the mechanism), and thirdly, I provide a greater number of immersed strips to insure more perfect agitation.

I accomplish the above improvements by the means illustrated in the accompanying drawings, in which similar numbers of reference refer to similar parts throughout, and in which—

Figure 1, represents a vertical section, near center, of my invention. Fig. 2, represents a detail view of the motive mechanism having the cover thereof removed and portions of the frame broken away to more fully disclose the mechanism. Fig. 3, represents a plan of the float and immersed strips. Fig. 4, represents a detail of the bayonet socket joint employed to connect certain parts of my mechanism together, and Fig. 5, represents a detail of the clamp employed to secure the invention on a milk can.

The frame or support to my invention is composed of preferably three similarly formed legs, 1, secured at their upper ends in a hub, 2. On the lower ends of said legs, 1, a straight and horizontal or radial portion exists at, 3, having a clamp, 4, thereon provided with set screws, 5, as shown, by which these clamps, 4, are secured on the legs, 1, and to the edge of a milk can as shown engaged by Fig. 1.

The straight or radial portion, 3, of each leg, 1, provides for the different diameters of milk cans on which my machine can be attached.

In the hub, 2, is formed a central vertical opening to admit a rod, 6, and to secure said rod, 6, at any desired height a set screw, 7, is provided as shown. On the upper end of said rod, 6, is fitted a conical or other suitably shaped shield, 8, to extend out over the legs, 1, and provide shelter for a can on which the machine may be attached, keep rain out, and protect the milk from objects getting into it. At the center of said shield, 8, is a hub, 9, through which the rod, 6, passes and by means of a set screw, 10, said shield, 8, can be secured at any height on said rod which extends upward a convenient distance to provide also for it being lowered when a small quantity of milk is in the can, on which my machine is employed.

On the lower end of the rod, 6, is supported a clock-work motor, 11, in which the necessary power to operate my machine is stored, by means of a strong spring, 12, wound on an axle, 13, which has also the usual ratchet wheel and pawl, 14, to retain said spring, 12, when wound on said axle, 13. On the axle, 13, is also a large gear wheel, 15, to mesh with a pinion, 16, on a second axle, 17, in said motor, 11. On the axle, 17, is also a large wheel, 18, which meshes with a pinion, 19, on a third axle indicated, 20, and on the axle, 20, is a bevel gear wheel, 21, meshing with an adapted pinion, 22, on a vertical shaft, 23, carried in an extended sleeve, 24, on a post, 25, in the frame of the motor, 11. At the upper end of the motor, 11, is also a similar post, 26, having a sleeve thereon and in which is an adapted opening or hole to receive the lower end of said rod, 6, as hereinbefore stated. In said sleeve on the post, 26, is formed a bayonet socket as shown in Fig. 4, to admit a pin or stud, 27, on the rod, 6, which does not extend out long enough to pass through the thickness of the sleeve in which it is formed, but by means of an outer ring soldered or brazed on as shown in section, the sleeve is strengthened.

In the sleeve, 24, at the lower end of the motor, 11, I employ a set screw, 28, to secure the shaft, 23, when winding up the motor, 11, when it is detached from the machine or when it is desired to stop it.

To protect the mechanism of the motor, 11, I employ a cover or casing, 29, preferably of sheet tin and which is only shown in Fig. 1, covering the mechanism entirely and allowing only the sleeves at each end to project.

To the lower end of the shaft, 23, is attached by means of a set screw, 30, (and a similar bayonet socket means as that securing the motor, 11, to the rod, 6,) the sleeve, 31, which is attached at its lower end to a conical float, 32, preferably constructed of sheet tin and a completely inclosed hollow vessel so as to float.

On the float, 32, are provided diametral arms, 33, having holes, 34, therein as shown. Each arm, 33, is double or composed of an upper and lower member so as to direct the rods or strips, 35, of sheet tin or other material placed in said holes, 34, and hanging into the milk to agitate the same, as they are carried on their circular courses with the float, 32, and its arms, 33. The holes, 34, in said arms, 33, are slotted longitudinally and transversely as shown in plan by Fig. 3, so that I can arrange the strips, 35, to give the required resistance and slow motion. By arranging the strips, 35, to present their width against the milk when being revolved, the greatest resistance and least speed are obtained. Instead of employing all flat strips, 35, in the arms, 33, small rods or stout wires may be substituted. I may also substitute for the conical float described and shown, hollow metallic cross arms and a central metallic strip.

Having described my invention, what I claim, and desire to secure by Letters Patent, is—

1. In a milk agitating machine, the combination of the supporting frame having means whereby it is secured on a milk can, the vertical rod carried by the central hub of said frame, and the shield as specified and secured adjustably on said vertical rod, substantially as shown and described.

2. In a milk agitating machine, the combination, of the supporting frame having means whereby it is secured on a milk can, the vertical rod adjustably secured in the hub of said frame, the clockwork motor secured on the lower end of said rod, and the float connected to the clockwork motor and having cross arms adapted to carry immersed strips, to agitate the milk, substantially as shown and described.

3. In a milk agitating machine, the combination of the supporting frame having means whereby it is secured on a milk can, the vertical rod adjustably secured in the hub of said frame, the shield adjustably secured on said rod above said frame, the clockwork motor secured to the lower end of said rod, and the float having radial arms carrying immersed strips, and means on said float whereby it is connected to said motor, substantially as shown and described.

BENJAMIN EWING.

In presence of—
R. D'ARCY SCOTT,
WALTER MACDONALD.